(12) United States Patent
Moetakef et al.

(10) Patent No.: US 8,459,226 B2
(45) Date of Patent: Jun. 11, 2013

(54) INTAKE MANIFOLD METAL POSTS

(75) Inventors: Mohammad Ali Moetakef, West Bloomfield, MI (US); Steven Poe, Canton, MI (US); Mario Joseph Felice, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 283 days.

(21) Appl. No.: 12/843,373

(22) Filed: Jul. 26, 2010

(65) Prior Publication Data
US 2012/0017864 A1 Jan. 26, 2012

(51) Int. Cl.
F02M 35/10 (2006.01)
(52) U.S. Cl.
USPC .................. 123/184.61; 123/184.21
(58) Field of Classification Search
USPC .......................... 123/184.61, 184.21
See application file for complete search history.

(56) References Cited

U.S. PATENT DOCUMENTS

| | | | |
|---|---|---|---|
| 5,640,937 A | 6/1997 | Slopsema | |
| 5,996,543 A * | 12/1999 | Nakayama et al. | 123/184.21 |
| 6,199,657 B1 | 3/2001 | Misawa et al. | |
| 6,234,130 B1 * | 5/2001 | Brassell et al. | 123/184.21 |
| 6,390,080 B1 * | 5/2002 | Dowding et al. | 123/572 |
| 6,584,946 B2 * | 7/2003 | Cardno et al. | 123/184.34 |
| 6,666,297 B2 | 12/2003 | Grosser et al. | |
| 6,679,215 B2 * | 1/2004 | Benson et al. | 123/184.34 |
| 6,857,409 B2 * | 2/2005 | Ito et al. | 123/184.42 |
| 7,021,263 B1 * | 4/2006 | Agnew et al. | 123/184.47 |
| 2003/0101957 A1 * | 6/2003 | Benson et al. | 123/184.34 |
| 2003/0221651 A1 * | 12/2003 | Ito et al. | 123/184.61 |
| 2005/0005888 A1 * | 1/2005 | Brassell et al. | 123/184.31 |
| 2005/0005890 A1 * | 1/2005 | Asfaw et al. | 123/184.61 |
| 2006/0027203 A1 * | 2/2006 | Cunningham et al. | 123/184.47 |
| 2008/0271697 A1 * | 11/2008 | Vichinsky | 123/184.56 |
| 2010/0089357 A1 | 4/2010 | Plaxton | |

FOREIGN PATENT DOCUMENTS

CN 201176902 Y 7/2009

OTHER PUBLICATIONS http://www.sae.org/automag/plastics/05.html, New Plastics and The Automobile, Under The Hood, 2010, pp. 1-4.

* cited by examiner

Primary Examiner — Noah Kamen
Assistant Examiner — Long T Tran

(57) ABSTRACT

An intake manifold is disclosed which has an upper shell portion having a first peripheral flange, a lower shell portion having a second peripheral flange, and at least one metallic post having a first plate and a second plate. The first and second peripheral flanges are friction welded and the first plate of the posts is friction welded to the upper shell portion and the second plate of the posts is friction welded to the lower shell portion. The upper and lower shells are made of a polymeric, or plastic, material. The metallic post is comprised substantially of aluminum or other suitable metals or alloys. The upper and lower shell portions define a cavity and a section of the post between the first and second plates traverses through the cavity.

20 Claims, 3 Drawing Sheets

INTAKE MANIFOLD METAL POSTS

BACKGROUND

1. Technical Field

The present disclosure relates to intake manifolds for internal combustion engines.

2. Background Art

Intake manifolds for internal combustion engine are commonly formed out of a polymeric material. In an effort to reduce noise radiating from the surface of the intake manifold due to resonant frequencies set up at particular engine speeds, it is known to provide internal and external bracing on the surface of the manifold and to provide internal posts formed out of the parent material. To provide the desired noise reduction, the cross-sectional area of polymeric internal posts is such that it reduces the flow area within the intake manifold, thereby limiting the peak power of the engine. This issue is particularly important for naturally aspirated engine, i.e. those without pressure charging on the intake, such as provided by superchargers or turbochargers. It may be possible to increase the size of the intake manifold to overcome the drop in flow area due to the posts, but with a corresponding increase in overall size of the manifold, which increases cost and weight and complicates packaging. Furthermore, a larger manifold may require thicker posts or more posts, further exacerbating the situation. Even with a larger manifold, the posts may cause eddies to form in the flow field that lead to noise at particular frequencies and/or cause undesirable flow patterns in the engine intake.

SUMMARY

To overcome at least one problem, an intake manifold is disclosed which has a shell made of substantially a polymeric material and a first metallic post coupled to the shell at two coupling locations on an interior surface of the shell wherein the post is substantially comprised of a metal. The first post couples to the two coupling locations of the shell at first and second ends of the first post with a portion of the first post between the first and second ends of the first post decoupled from the shell, i.e., extending through a cavity defined by the shell. The shell has an upper portion having a first peripheral flange and a lower portion having a second peripheral flange. The upper portion is coupled to the lower portion at the first and second peripheral flanges. A first of the two coupling locations at which the first post is coupled is on the upper portion and a second of the two coupling locations at which the first post is coupled is on the lower portion. The coupling locations are displaced from the flanges. In some embodiments, the manifold includes a metallic second post, with a first end of the second post coupled to a third coupling location on the upper shell portion and a second end of the second post coupled to a fourth coupling location on the lower shell portion.

In some embodiments, the posts are substantially cylindrical along a majority of a length of the first post and have plates on first and second ends of the posts.

The post has a first plate on a first end, the post has a second plate on a second end, the post couples to the two coupling locations of the shell at the first and second plates, and the post substantially decoupled from the shell between the first and second plates. In embodiments with multiple posts, the posts are generally aligned along a direction of flow through the manifold. The material thickness at the two coupling locations is greater than the material provided in a region proximate the two coupling locations.

Also disclosed is an intake manifold having an upper shell portion having a first peripheral flange, a lower shell portion having a second peripheral flange, and at least one metallic post having a first plate and a second plate. The first and second peripheral flanges are friction welded and the first plate is friction welded to the upper shell portion and the second plate is friction welded to the lower shell portion. The upper and lower shells are made of a polymeric, or plastic, material. The metallic post is comprised substantially of aluminum or other suitable metals or alloys. The upper and lower shell portions define a cavity and a section of the post between the first and second plates traverses through the cavity.

A method to manufacture an intake manifold includes: injection molding an upper shell portion having a first peripheral flange, injection molding a lower shell portion having a second peripheral flange, and friction welding the upper and lower shell portions at first and second peripheral flanges. At least one post is placed in between the upper and lower shell portions with a first end of each post friction welded to one of the shell portions simultaneously with the friction welding of the upper and lower shell portions. Plates are provided on the posts by cold heading or welding. In one embodiment, one of the posts is friction welded onto one of the upper or lower shell portions prior to the friction welding of the upper and lower shells at their respective flanges. The upper shell portion and the lower shell portion are polymeric and the posts are substantially metallic.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations.

Figure 1:
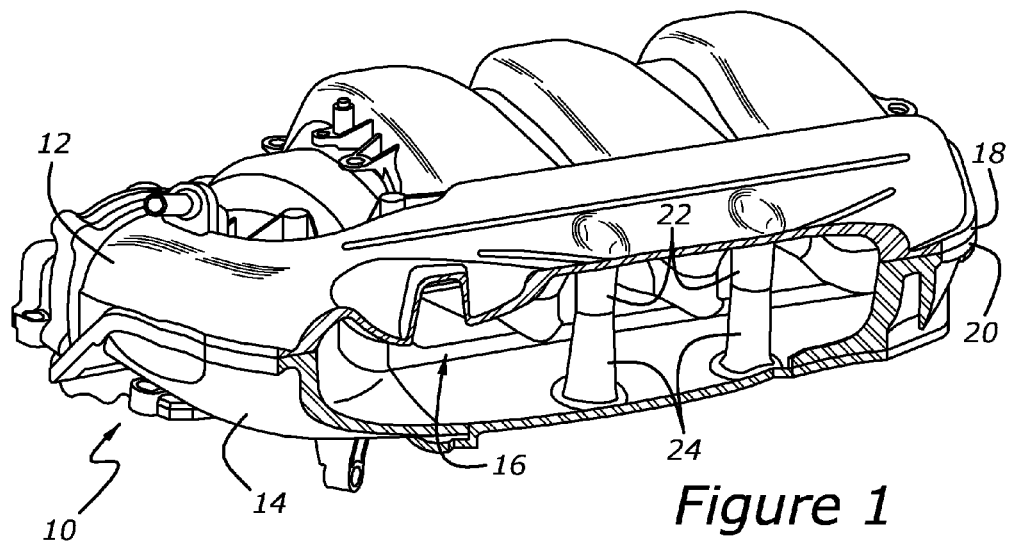
FIG. 1 is a cutaway of an intake manifold having polymeric posts.

In FIG. 1, a cutaway of an intake manifold 10 has an upper shell portion 12 and a lower shell portion 14 which form a shell that defines a cavity 16. Upper shell portion 12 and lower shell portion 14 are coupled at first flange 18 and second flange 20. Upper shell portion 14 has two posts 22 extending downwardly and lower portion 16 has two posts 24 extending upwardly. The shells are coupled together in a friction welding process during which tips of posts 22, 24 are friction welded, creating a single post extending between upper shell portion 12 and lower shell portion 14. The diameter of posts 22, 24 are such that they interfere with air flow through intake manifold 10.

Figure 2:
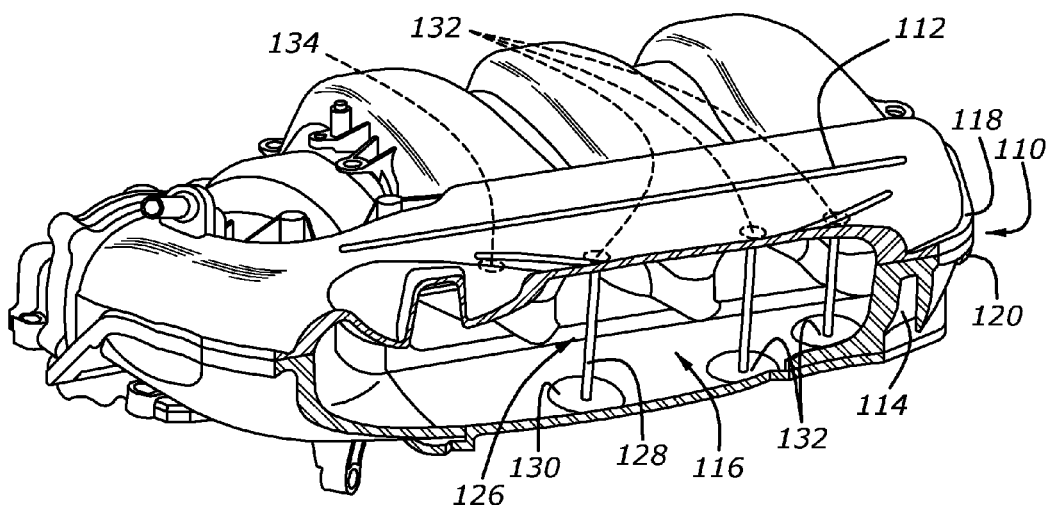
FIG. 2 is a cutaway of an intake manifold having aluminum posts.

In FIG. 2, a cutaway of an intake manifold 110, according to an embodiment of the disclosure, has an upper shell portion 112 and a lower shell portion 114 which form a shell that defines a cavity 116. Upper shell portion 112 and lower shell portion 114 are coupled at first flange 118 and second flange 120. Three metallic posts 126 are coupled between upper shell portion 112 and lower portion 114. Three aluminum posts are shown by way of example and not intended to be limiting. More or fewer posts are within the scope of the disclosure as well as posts made of other metals. The shell portions 112, 114 are friction welded together. Posts 126 have plates 130 at each end of a shaft 128 of the post. However, only a lower plate is visible in FIG. 2. Each plate 130 couples to predetermined locations 132 on either an upper shell portion 112 or a lower shell portion 114. In one embodiment, the polymeric material is thicker at the predetermined locations 132 than in shell material (such as portion 134) proximate the predetermined locations 132.

Figure 3:
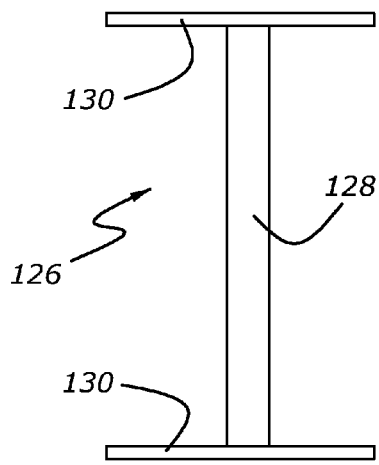
FIG. 3 is a post with plates on the two ends.

In FIG. 3, a metal post 126 has a shaft portion 128 and plates 130 at first and second ends of shaft portion 128. Shaft portion may be cylindrical or any other suitable shape, such as square or rectangular with the longer side of the rectangle substantially parallel to flow through the intake manifold. Plates 130 can be cold formed from shaft material, i.e., starting out with a shaft of greater length than the finished post and forming plates 130 from the extra length. Alternatively, plates 130 are attached to shaft 128 by cold forming processes: such as cold heading (forging), as one example, or heated processes such as friction welding and stud welding, as examples, or any other suitable process may be used.

Figure 4:
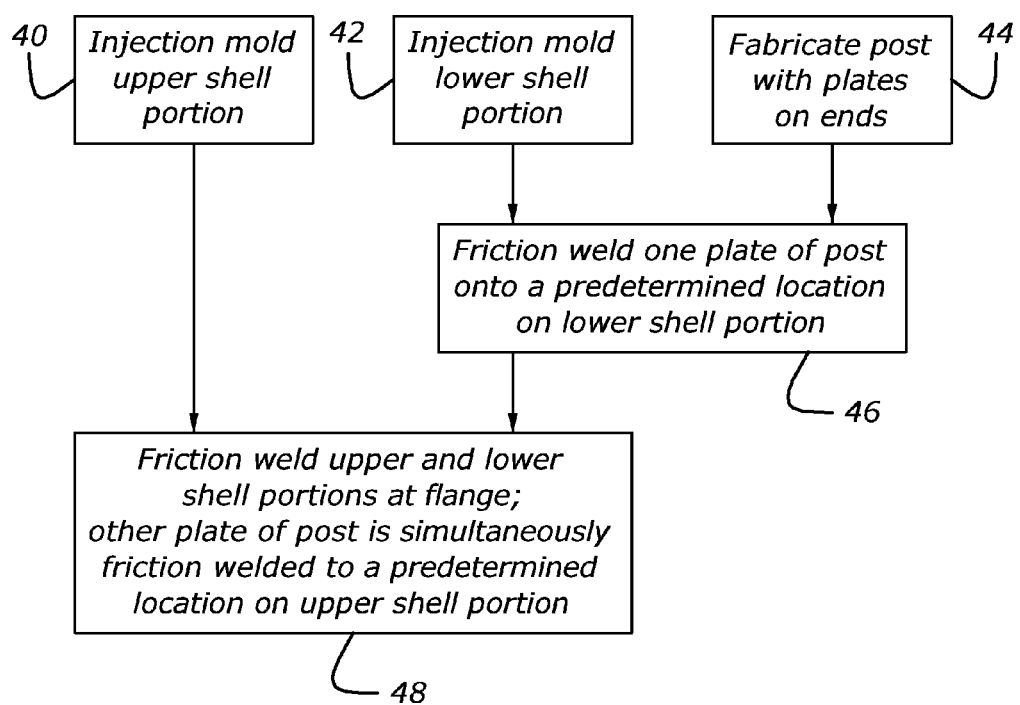
FIG. 4 is a flowchart of one embodiment of a process to manufacture an intake manifold.

In FIG. 4, a flowchart of one embodiment of the manufacture of the intake manifold is shown in which the upper shell portion is injection molded 40 and the lower shell portion is injection molded 42. The post having the plates on the ends is fabricated by manufacturing processes listed above or any other suitable process, block 44. In block 46, one of the plates of the post (or one end of each of the posts, if multiple posts are used) is friction welded with the lower shell portion. In block 48, the lower shell portion with the coupled post(s) is friction welded with the upper shell portion. While the two shell portions are friction welded, the end of the post that is not yet welded, friction welds to the upper shell portion while the two shell portions are being friction welded.

In a friction welding process between two pieces of the same composition, such as the upper shell portion and the lower shell portion are in one embodiment, the surface of the material at the joint melts and the two become an integral piece once the surfaces cool. In the case of aluminum friction welding with a polymer having a lower melting temperature than the aluminum, the polymer melts and adheres to the solid aluminum. A plate is provided on the post, according to some embodiments, to provide additional surface area for adherence than would be the case if the polymer were to adhere to an end of a post that does not have a plate.

In an alternative embodiment, the post is first coupled on one end with the upper shell portion prior to assembling with the lower shell. In yet another alternative, both ends of the posts are friction welded during the friction welding of the upper and lower shell portions. The post may be held in place by a special fixture that gains access through one of the inlets of the manifold or the multiple outlets.

Figure 5:
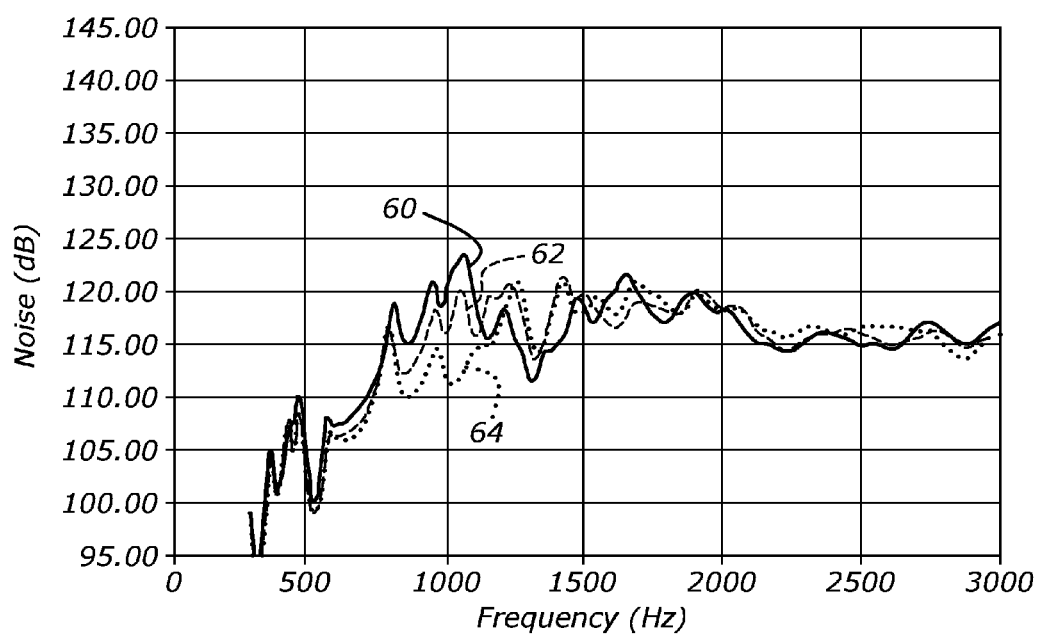
FIG. 5 is a plot of simulated results of radiated noise as a function of frequency for intake manifolds having posts extending across the cavity within the intake manifolds.

In FIG. 5, computer aided simulation of radiated noise as a function of frequency is shown for three manifold configurations: two polymeric posts 60, two aluminum posts 62, and three aluminum posts 64. The aluminum post cases radiate less noise than the polymeric post case, except in the 1250 Hz range. In spite of the aluminum posts having a much narrower cross-section impeding flow in the intake manifold. The three-post embodiment 64 provides greater noise attenuation than the other two embodiments 60, 62, at most frequency ranges, but with the added complexity of adding a third post.

While the best mode has been described in detail, those familiar with the art will recognize various alternative designs and embodiments within the scope of the following claims. Where one or more embodiments have been described as providing advantages or being preferred over other embodiments and/or over background art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. For example, it may be beneficial to provide many posts in the intake manifold to reduce noise as much as possible; however, from a cost, weight, and occlusion standpoint, it may be useful to use fewer posts. The embodiments described as being less desirable relative to other embodiments with respect to one or more characteristics are not outside the scope of the disclosure as claimed.

What is claimed:

1. An intake manifold for an internal combustion engine, comprising:
    a shell comprised substantially of a polymeric material, the shell having an upper portion and a lower portion forming a cavity; and
    a post extending through the cavity, the post being coupled between the upper portion and the lower portion with opposing ends of the post being coupled at two coupling locations on an interior surface of the shell, one location being on the upper portion and the other being on the lower portion and wherein the post is substantially comprised of a metal.

2. The intake manifold of claim 1 wherein the t post couples to the two coupling locations of the shell at first and second ends of the post with a portion of the post between the first and second ends of the post decoupled from the shell.

3. The intake manifold of claim 1 wherein:
    the shell is comprised of the upper portion having a first peripheral flange and the lower portion having a second peripheral flange;
    the upper portion and the lower portion are coupled between the first and second peripheral flanges; and
    wherein the coupling locations are displaced from the flanges.

4. An intake manifold for an internal combustion engine, comprising:
    a shell comprised substantially of a polymeric material; and
    a post coupled to the shell at two coupling locations on an interior surface of the shell wherein the post is substantially comprised of a metal; and
    wherein the shell is comprised of an upper shell portion and a lower shell portion and the two coupling locations at which the post is coupled to the shell comprise a first coupling location coupled to the upper shell portion and a second coupling location coupled to the lower shell portion, further comprising:
    a second post, with a first end of the second post coupled to a third coupling location on the upper shell portion and a second end of the second post coupled to a fourth coupling location on the lower shell portion.

5. An intake manifold for an internal combustion engine, comprising:
- a shell comprised substantially of a polymeric material; and
- a post coupled to the shell at two coupling locations on an interior surface of the shell wherein the post is substantially comprised of a metal; wherein the post is substantially cylindrical along a majority of a length of the first post and has plates on first and second ends of the first post.

6. An intake manifold for an internal combustion engine, comprising:
- a shell comprised substantially of a polymeric material; and
- a post coupled to the shell at two coupling locations on an interior surface of the shell wherein the post is substantially comprised of a metal; wherein the post has a first plate on a first end, the first post has a second plate on a second end, the first post couples to the two coupling locations of the shell at the first and second plates.

7. An intake manifold for an internal combustion engine, comprising:
- a shell comprised substantially of a polymeric material; and
- a post coupled to the shell at two coupling locations on an interior surface of the shell wherein the post is substantially comprised of a metal; further comprising:
- at least one additional post comprised of a metal coupled to the shell at two additional coupling locations on an interior surface of the shell wherein the first post and the at least one additional post are generally aligned with a direction of flow through the manifold.

8. An intake manifold for an internal combustion engine, comprising:
- a shell comprised substantially of a polymeric material; and
- a post coupled to the shell at two coupling locations on an interior surface of the shell wherein the post is substantially comprised of a metal; wherein material thickness of the shell at the two coupling locations are greater than material proximate the two coupling locations.

9. An intake manifold for an internal combustion engine, comprising:
- an upper shell portion having a first peripheral flange;
- a lower shell portion having a second peripheral flange;
- a metallic post having a first plate and a second plate wherein the first and second peripheral flanges are friction welded and the first plate is friction welded to the upper shell portion and the second plate is friction welded to the lower shell portion.

10. The intake manifold of claim 9 wherein the upper and lower shells are comprised of a polymeric material.

11. The intake manifold of claim 9 wherein the metallic post is comprised substantially of aluminum.

12. The intake manifold of claim 9 wherein and a section of the post between the first and second plates traverses through the cavity.

13. The intake manifold of claim 9, further comprising:
- at least one additional post passing through the cavity having first and second plates on ends of the additional post with the first plate of the additional post welded to the upper shell portion and the second plate of the additional post welded to the lower shell portion.

14. The intake manifold of claim 9 wherein the metallic post is welded to the upper and lower shell portions at predetermined locations on an interior surface of the shell portions and the predetermined locations are thicker than shell surfaces proximate the predetermined locations.

15. A method to manufacture an intake manifold, comprising:
- injection molding an upper shell portion having a first peripheral flange;
- injection molding a lower shell portion having a second peripheral flange; and
- friction welding the upper and lower shell portions at first and second peripheral flanges to form cavity wherein at least one post is placed in between the upper and lower shell portions with a first end of each post friction welded to one of the shell portions simultaneously with the friction welding and wherein the post passes through the cavity.

16. The method of claim 15, further comprising:
cold heading plates on ends of the roughly cylindrical post.

17. The method of claim 15, further comprising:
welding plates onto ends of the post.

18. The method of claim 15, further comprising:
friction welding a second end of the post to one of the shell portions prior to the friction welding of the first and second peripheral flanges.

19. The method of claim 15 wherein a second end of the post friction welded to another of the shell portions is welded simultaneously with the friction welding.

20. The method of claim 15 wherein the upper shell portion and the lower shell portion are comprised of a polymer and the post is substantially comprised of a metal.

* * * * *